(12) United States Patent
Hong et al.

(10) Patent No.: US 12,657,661 B2
(45) Date of Patent: Jun. 16, 2026

(54) LEAST SIGNIFICANT BIT (LSB) INFORMATION PRESERVED SIGNAL INTERPOLATION WITH LOW BIT RESOLUTION PROCESSORS

(71) Applicant: Samsung Electronics Co., Ltd., Suwon-si (KR)

(72) Inventors: Hunsop Hong, Irvine, CA (US); Seongnam Oh, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 310 days.

(21) Appl. No.: 18/465,538

(22) Filed: Sep. 12, 2023

(65) Prior Publication Data

US 2024/0119562 A1      Apr. 11, 2024

Related U.S. Application Data

(60) Provisional application No. 63/414,978, filed on Oct. 11, 2022.

(51) Int. Cl.
*G06T 5/00* (2024.01)
*G06T 3/4053* (2024.01)

(52) U.S. Cl.
CPC .............. *G06T 5/00* (2013.01); *G06T 3/4053* (2013.01); *G06T 2207/10016* (2013.01)

(58) Field of Classification Search
CPC .................... G06T 5/00; G06T 3/4053; G06T 2207/10016; G06T 3/4092; G06T 1/20; H04N 19/436
See application file for complete search history.

(56) References Cited

U.S. PATENT DOCUMENTS

| | | | |
|---|---|---|---|
| 7,692,833 B2 | 4/2010 | Ito | |
| 9,838,715 B2 | 12/2017 | Fukuhara et al. | |
| 10,002,409 B2 | 6/2018 | Lim et al. | |
| 10,594,971 B2 | 3/2020 | Totsuka et al. | |
| 11,587,213 B1 | 2/2023 | Hsu et al. | |

(Continued)

FOREIGN PATENT DOCUMENTS

| | | |
|---|---|---|
| EP | 3 442 235 A1 | 2/2019 |
| JP | 10-322553 A2 | 12/1998 |

OTHER PUBLICATIONS

International Search Report and Written Opinion dated Jan. 9, 2024 for International Application PCT/KR2023/015505, from Korean Intellectual Property Office, pp. 1-11, Republic of Korea.

(Continued)

*Primary Examiner* — Chan S Park
*Assistant Examiner* — Daniel C Chang
(74) *Attorney, Agent, or Firm* — Sherman IP LLP; Kenneth L. Sherman; Steven Laut

(57) ABSTRACT

One embodiment provides a computer-implemented method that includes receiving content having a first resolution. The processor splits the content into most significant bits and least significant bits. The processor further performs processing of the most significant bits of the content while preserving the least significant bits. The processor additionally performs a linear combination of outputs of the processing of the most significant bits with the preserved least significant bits for improving quality of the content.

20 Claims, 10 Drawing Sheets

(56)         References Cited

U.S. PATENT DOCUMENTS

| | | |
|---|---|---|
| 2003/0018677 A1 | 1/2003 | Mathur et al. |
| 2003/0179938 A1 | 9/2003 | Van Der Vleuten |
| 2014/0301719 A1* | 10/2014 | Pearlstein ........... G06F 12/0875 |
| | | 386/326 |
| 2018/0005344 A1* | 1/2018 | Lim ......................... G06T 1/20 |
| 2018/0084281 A1 | 3/2018 | Hsieh et al. |
| 2018/0262706 A1 | 9/2018 | Totsuka et al. |
| 2019/0306475 A1 | 10/2019 | Inukai et al. |
| 2021/0392377 A1 | 12/2021 | Taubman |
| 2022/0269483 A1 | 8/2022 | Lo et al. |
| 2022/0321869 A1 | 10/2022 | Chang et al. |

OTHER PUBLICATIONS

Extended European Search Report dated Mar. 25, 2025 for EP Application No. 23877621.5, from European Patent Office, pp. 1-10, Munich, DE.

* cited by examiner

Input/processing 8bit (Linear)

4bit processing

Proposed 4bit processing + LSB processing

Linear Domain Processing Case Result

Input/processing 8bit (Gamma Encoded)

4bit processing

Proposed 4bit processing + LSB processing

Gamma Correction Processing Case Result

1000

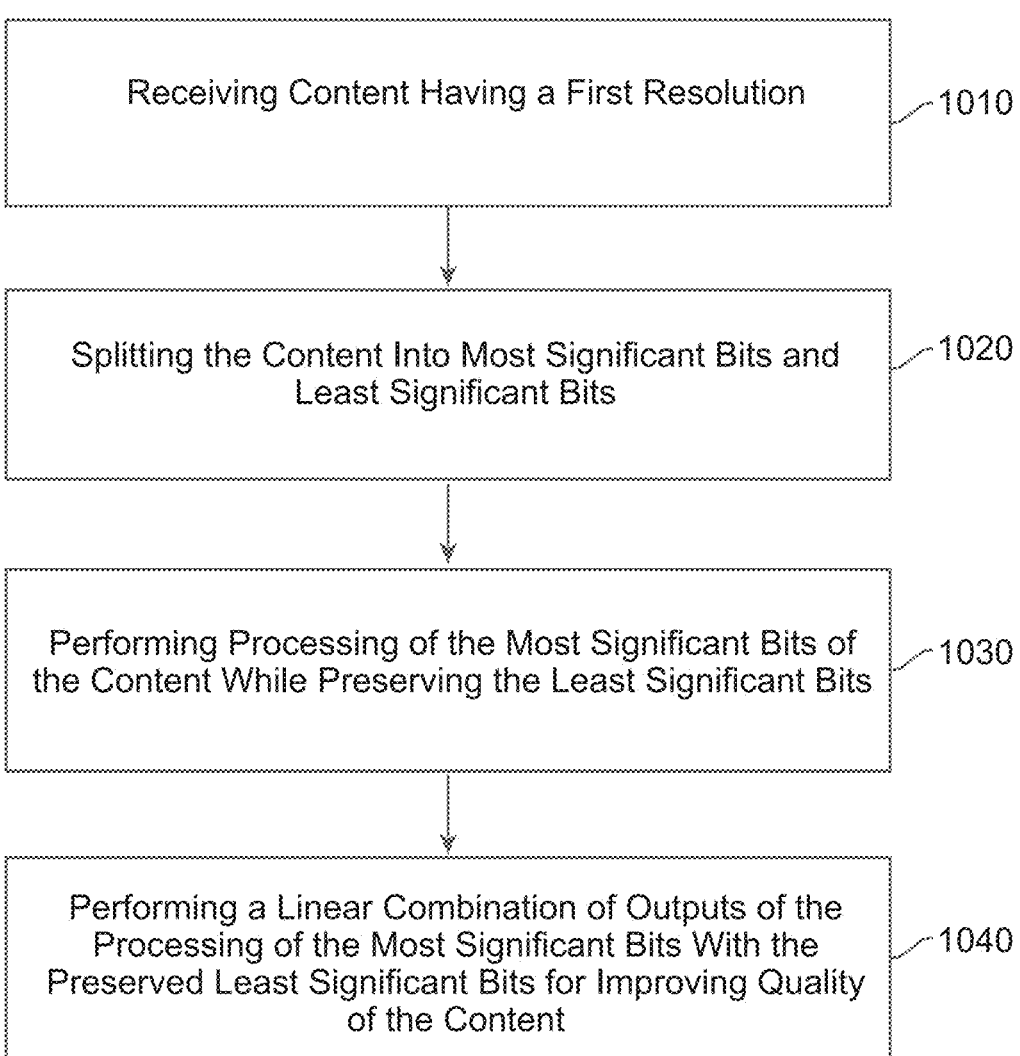

Receiving Content Having a First Resolution ⟋1010

Splitting the Content Into Most Significant Bits and Least Significant Bits ⟋1020

Performing Processing of the Most Significant Bits of the Content While Preserving the Least Significant Bits ⟋1030

Performing a Linear Combination of Outputs of the Processing of the Most Significant Bits With the Preserved Least Significant Bits for Improving Quality of the Content ⟋1040

FIG. 10

LEAST SIGNIFICANT BIT (LSB) INFORMATION PRESERVED SIGNAL INTERPOLATION WITH LOW BIT RESOLUTION PROCESSORS

CROSS-REFERENCE TO RELATED APPLICATIONS

This application claims the priority benefit of U.S. Provisional Patent Application Ser. No. 63/414,978, Oct. 11, 2022, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to integration of various image/video processing blocks, and in particular, to preserving least significant bits (LSBs) in reconstruction of information after passing a given processing block.

BACKGROUND

Often times, video image processing intellectual properties (IPs, i.e., such as one or more units of logic, cells, chip layout designs, circuits, hardware components, etc.) are given in terms of hidden blocks, such as one or more libraries. In some cases, it is not possible to modify the provided IP (e.g., one or more blocks, libraries, etc.) and the IP should be used as is. During the integration of those IPs into an existing system, data accuracy preservation with the available IPs is critical, especially with respect to video image quality enhancement perspectives, and many image processing blocks also have a bit conversion operation to generate different bit resolutions. Some IPs, however, have lower bit-resolution; if the IPs are directly utilized without any upgrade, and the details (e.g., data accuracy) of the signal can be lost due to limitation of the bit-depth management of the existing algorithm IP and the bit conversion within the IP.

SUMMARY

One embodiment provides a computer-implemented method that includes receiving content having a first resolution. The processor splits the content into most significant bits and least significant bits. The processor further performs processing of the most significant bits of the content while preserving the least significant bits. The processor additionally performs a linear combination of outputs of the processing of the most significant bits with the preserved least significant bits for improving quality of the content.

Another embodiment includes a non-transitory processor-readable medium that includes a program that when executed by a processor performs improving picture quality of a display that includes receiving content having a first resolution. The processor splits the content into most significant bits and least significant bits. The processor further performs processing of the most significant bits of the content while preserving the least significant bits. The processor additionally performs a linear combination of outputs of the processing of the most significant bits with the preserved least significant bits for improving quality of the content.

Still another embodiment provides an apparatus that includes a memory storing instructions, and at least one processor executes the instructions including a process configured to receive region information from a stationary region detection process for a video. The process further performs a flat region ghosting artifact removal process that updates the region information with a flat region indicator utilizing the region information and the video. The process additionally performs a region based luminance reduction process utilizing the updated region information with the flat region indicator for display ghosting artifact removal and burn-in protection.

These and other features, aspects and advantages of the one or more embodiments will become understood with reference to the following description, appended claims and accompanying figures.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 10 illustrates a process for preserving least significant bit (LSB) information with low bit resolution processors, according to some embodiments.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

A description of example embodiments is provided on the following pages. The text and figures are provided solely as examples to aid the reader in understanding the disclosed technology. They are not intended and are not to be construed as limiting the scope of this disclosed technology in any manner. Although certain embodiments and examples have been provided, it will be apparent to those skilled in the art based on the disclosures herein that changes in the embodiments and examples shown may be made without departing from the scope of this disclosed technology.

One or more embodiments relate generally to integration of various image/video processing blocks, and in particular, to preserving least significant bits (LSBs) in reconstruction of information after passing a given processing block. One embodiment provides a computer-implemented method that includes receiving content having a first resolution. The processor splits the content into most significant bits and least significant bits. The processor further performs processing of the most significant bits of the content while preserving the least significant bits. The processor additionally performs a linear combination of outputs of the processing of the most significant bits with the preserved least significant bits for improving quality of the content.

Figure 1:
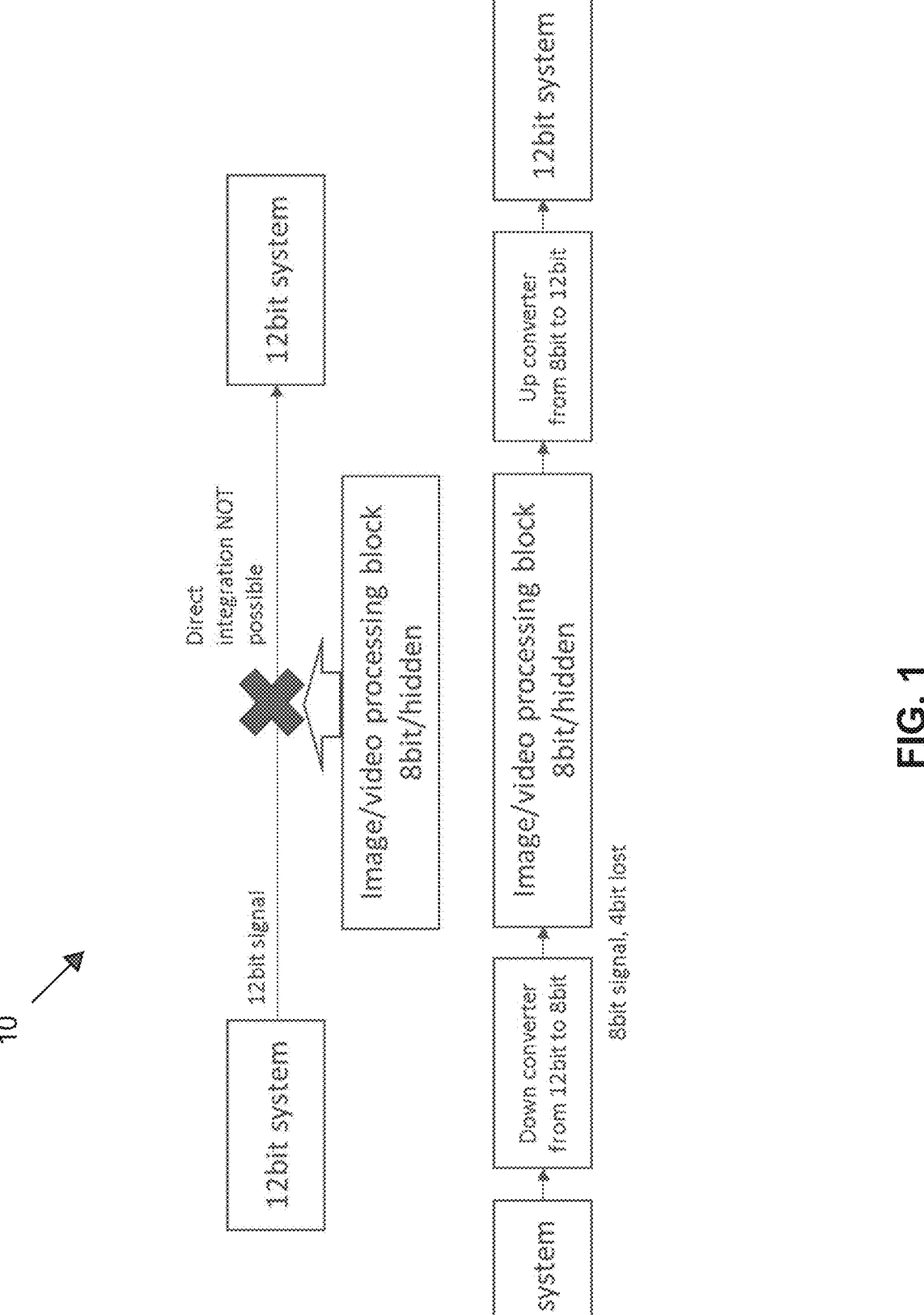
FIG. 1 illustrates an example of a 12 bit system with 8 bit intellectual property (IP) component utilization and an integration that causes quality degradation.

FIG. 1 illustrates an example 10 of a 12 bit system with 8 bit intellectual properties (IPs, i.e., such as one or more units of logic, cells, chip layout designs, circuits, hardware components, etc.) component utilization and an integration that causes quality degradation. Combining and/or integrating various image/video processing blocks is one of the most frequent tasks occurring during system integration such as high dynamic range (HDR)10+(HDR video technology that adds dynamic metadata to HDR10 source files). However, not all of the processing blocks can fully fit in the system requirements, and a common variation of the different capabilities of each block is the bit resolution handling capability. Worse off, those blocks are often given in a hidden or fixed block, such as with library form. Because of the restriction, in such cases, some information is lost through the blocks because the LSB can be trimmed out. The example 10 of the 12 bit system with 8 bit IP component utilization and an integration causes quality degradation due to the bit-depth conversion option to utilize the 8 bit IP.

Figure 2:
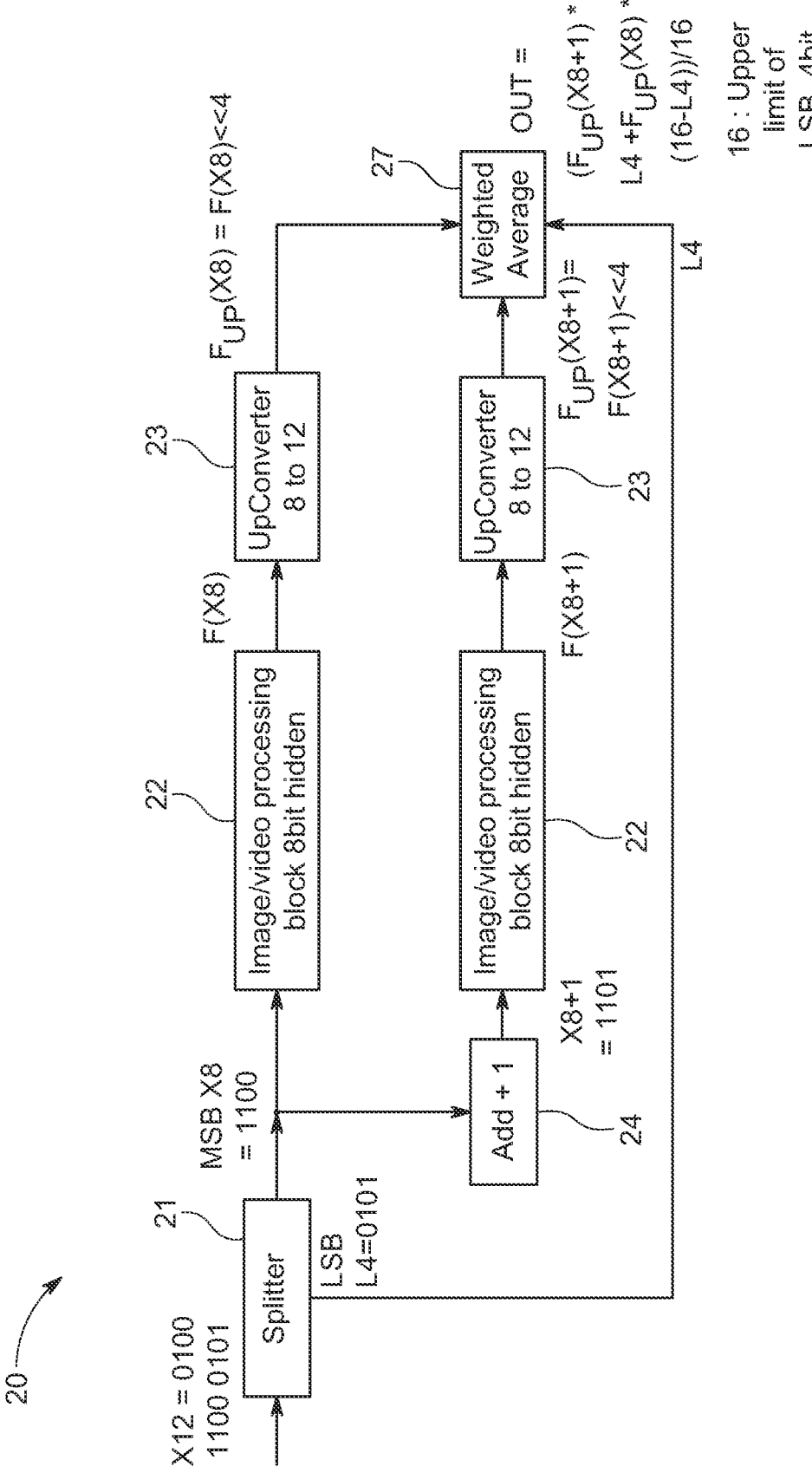
FIG. 2 illustrates an example architecture of the disclosed technology, according to some embodiments.

FIG. 2 illustrates an example architecture 20 of the disclosed technology, according to some embodiments. In order to preserve the lost LSB information with utilization of single IP, one or more embodiments provide for the LSB information to be retained with multiple IP instance utilization, and also used for reconstruction of the information after passing the given processing block. Considering a system architecture 20 with 12 bit resolution as an example, there is an image processing block (image/video processing block 8 bit hidden 22) to be integrated into the system architecture 20 whose bit resolution is 8 bit and it is hidden. The LSBs can be trimmed out because the system architecture 20 utilizes the low bit resolution processing block (image/video processing block 8 bit hidden 22) and this processing block can only process 8 bit resolution. The final results can lose the LSB information and can show a ragged step line (8 bit signal 32, FIG. 3), as compared to the smooth curve from the 12 bit signal 33 (FIG. 3) paired processing result. Such ragged output from the IP has a significant likelihood of incurring visual banding artifact(s). Such a problem can be systemically overcome with building up parallel LSBs preservation and utilization mechanism with same IP multi-instance utilization and specifically designed pre-processing and post-processing algorithms to mimic the result which can be ideally generated from 12 bit IP processing utilization.

In one or more embodiments, the system architecture 20 includes a splitter 21, UpConverters 23, image/video processing blocks 8 bit hidden 22, an add+1 process block 24 and a weighted average process block 27. In some embodiments, the splitter 21 splits off the LSB portion and the most significant bits (MSBs) of the input to the splitter 21. After the image/video processing blocks 8 bit hidden 22 (upper) processes the MSBs, the result is converted from 8 bit to 12 bit in this example by the UpConverter 23 (upper) where the result is processed by the weighted average process block 27. The LSBs that are split off the input signal by the splitter 21 are also input and are processed by the weighted average process block 27. The add+1 process block 24 adds a bit to the MSB portion where the result is processed by the image/video processing blocks 8 bit hidden 22 (lower). The result from the image/video processing blocks 8 bit hidden 22 (lower) is up converted from 8 bits to 12 bits by the UpConverter 23 (lower) and the result is also input to the weighted average process block 27.

Figure 3:
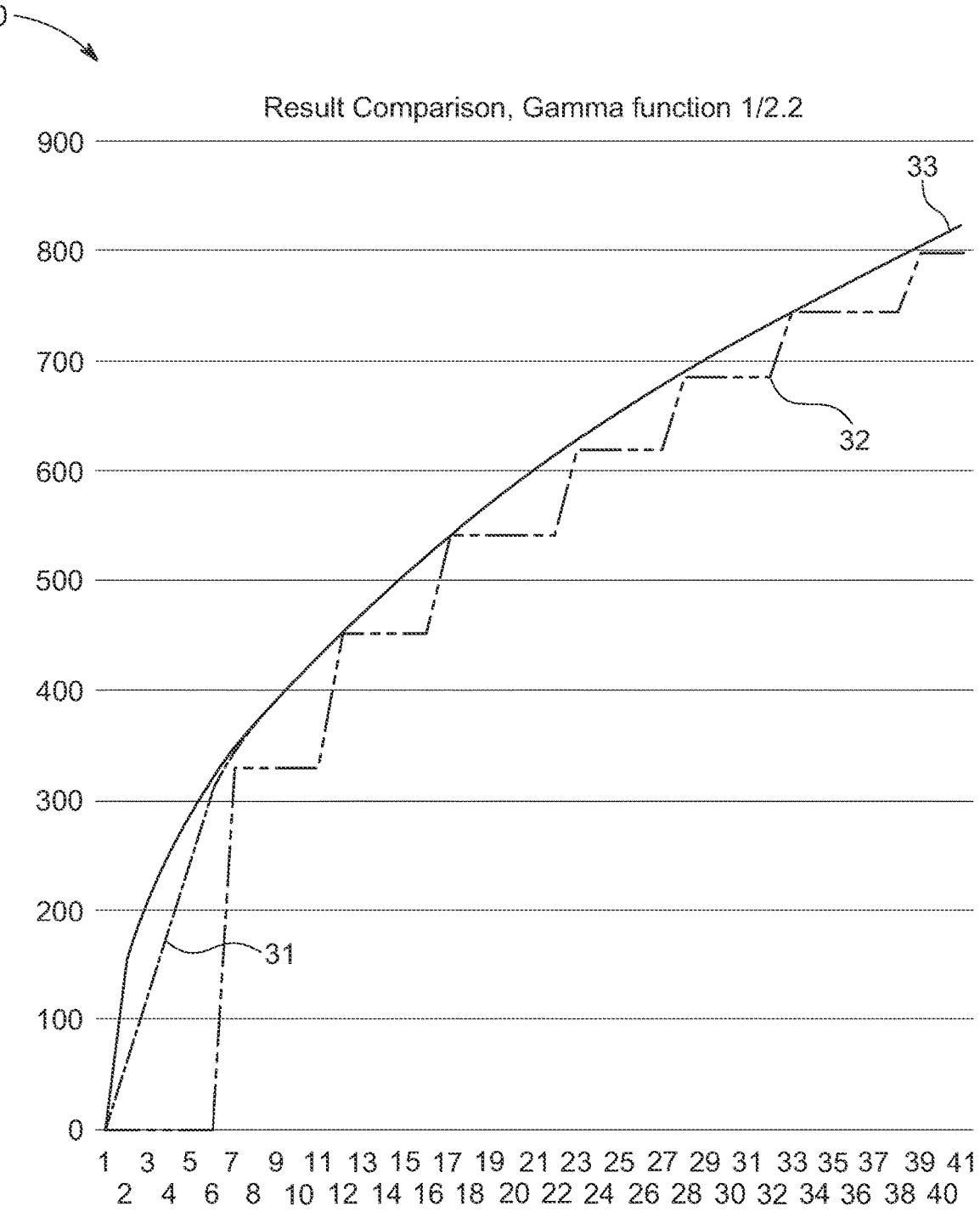
FIG. 3 illustrates a comparative graph of system results of different resolutions and the disclosed technology, according to some embodiments.

FIG. 3 illustrates a comparative graph 30 of system results of different resolutions and the disclosed technology, according to some embodiments. As shown, the graph 30 compares the 8 bit signal 32, the 12 bit signal 33 and the result of the proposed output 31 of the present technology. As shown, the 12 bit signal 33 and the proposed output 31 of the present technology track closely while the 8 bit signal 32 shows a ragged step (or sawtooth) line.

Figure 4:
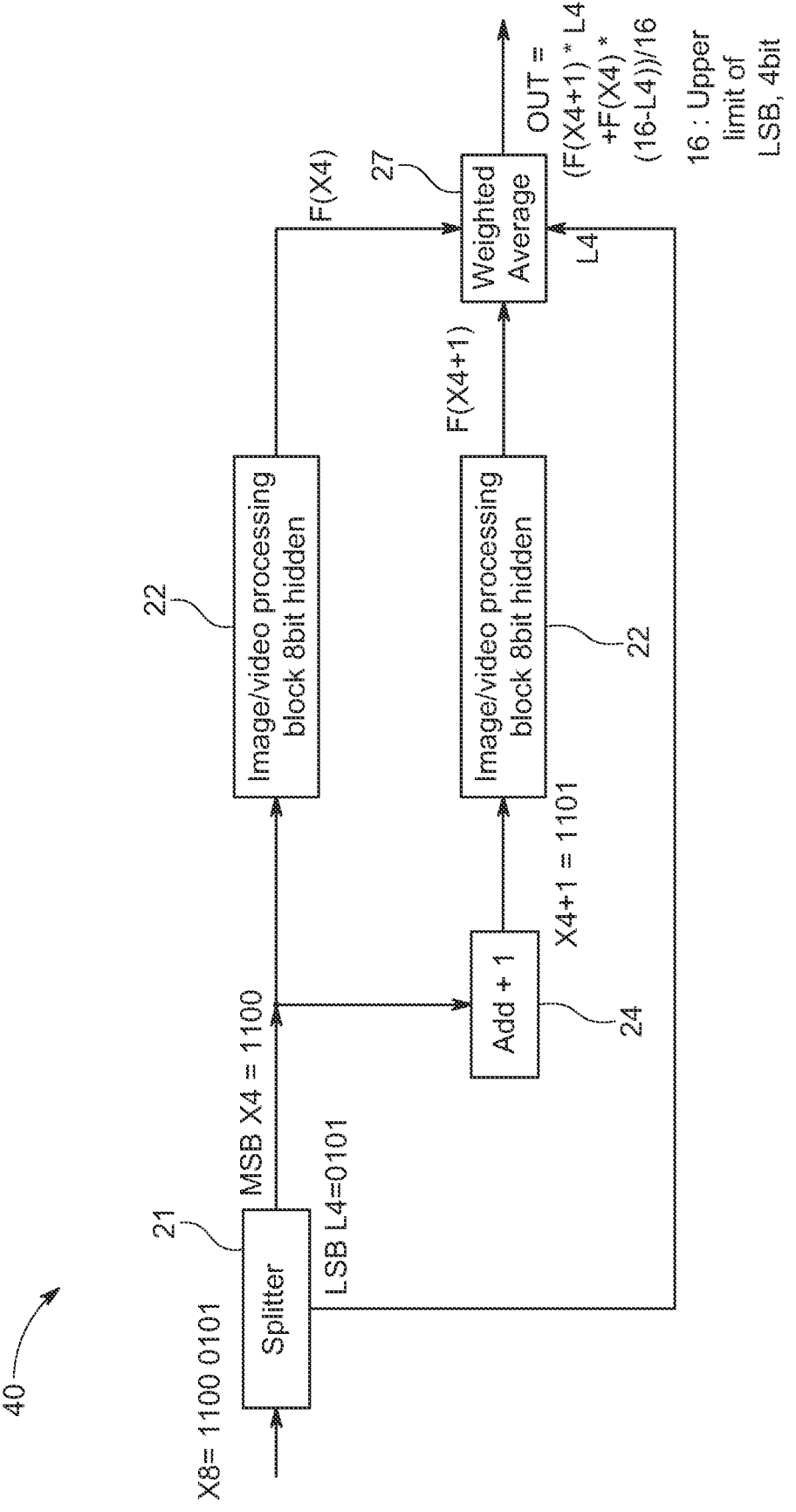
FIG. 4 illustrates another example architecture of the disclosed technology with parallelization and multi instantiation of low-level intellectual properties (IPs), according to some embodiments.

FIG. 4 illustrates another example architecture 40 of the disclosed technology with parallelization and multi instantiation of low-level IPs, according to some embodiments. The example architecture 40 uses bilinear interpolation. In one or more embodiments, the example architecture 40 includes the splitter 21, two image/video processing block 8 bit hidden 22, add+1 process block 24 and the weighted average process block 27. In some embodiments, the output from the weighted average process block 27 is shown as $(F(X4+1)*L4+F(X4)*(16-L4))/16$, where 16 is the upper limit of the LSB, 4 bit. Example results (see, e.g., graphs 52 and 55, FIG. 5) show that the disclosed technology provides smooth output as compared to the direct results of a single low bit resolution processing block (see, e.g., graphs 50, 51, 53 and 54, FIG. 5). As such, one or more embodiments of the disclosed technology improve the picture quality with parallelization and multi instantiation of low-level IP with additional systemic extra logics; the disclosed technology may be utilized to build a high quality system without changing the IP component.

Figure 5:
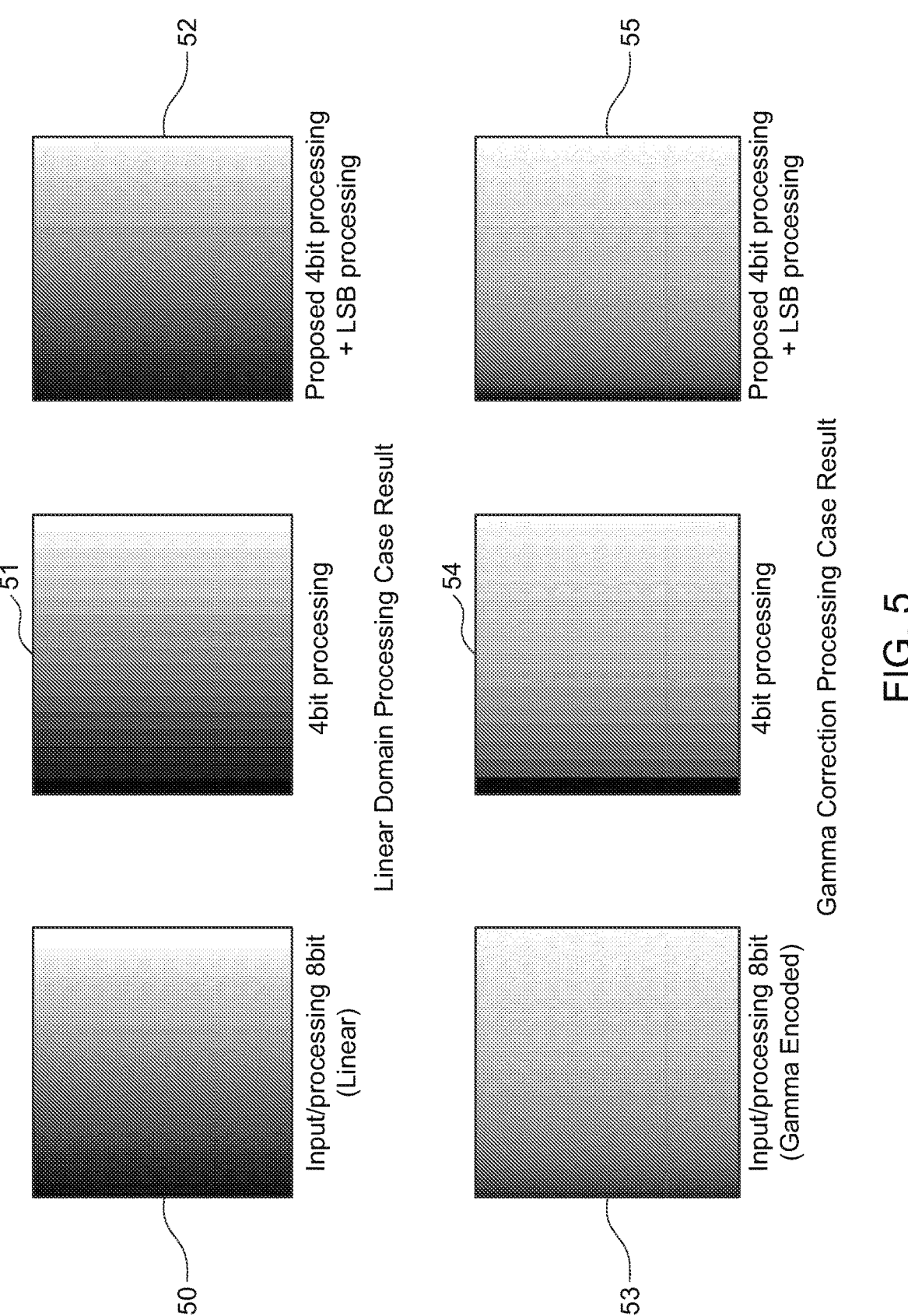
FIG. 5 illustrates example graphs for comparison of linear domain processing, gamma correction processing results of conventional systems and the disclosed technology, according to some embodiments.

FIG. 5 illustrates example graphs for comparison of linear domain processing, gamma correction processing results of conventional systems, and the disclosed technology, according to some embodiments. For easy comparison, 8 bit synthetic bitmap images are used. Graph 50 shows results of a conventional linear input/processing for an 8 bit system. Graph 51 shows results of a conventional linear domain processing for a 4 bit system. Graph 52 shows results of one or more embodiments using 4 bit processing+LSB processing. Graph 53 shows results of a conventional gamma encoded input/processing for an 8 bit system. Graph 54 shows results of a conventional gamma correction processing for a 4 bit system. Graph 55 shows results of one or more embodiments using 4 bit processing+LSB processing. The results show that the proposed technology seen in graphs 52 and 55 each have smooth output compared to the direct results of a single low bit resolution processing block as with graphs 50, 51, 53 and 54. Therefore, the picture quality may be improved with parallelization and multi instantiation of low-level IP with additional systemic extra logics, and the disclosed technology may be utilized to build new high quality systems without changing the IP component.

Figure 6:
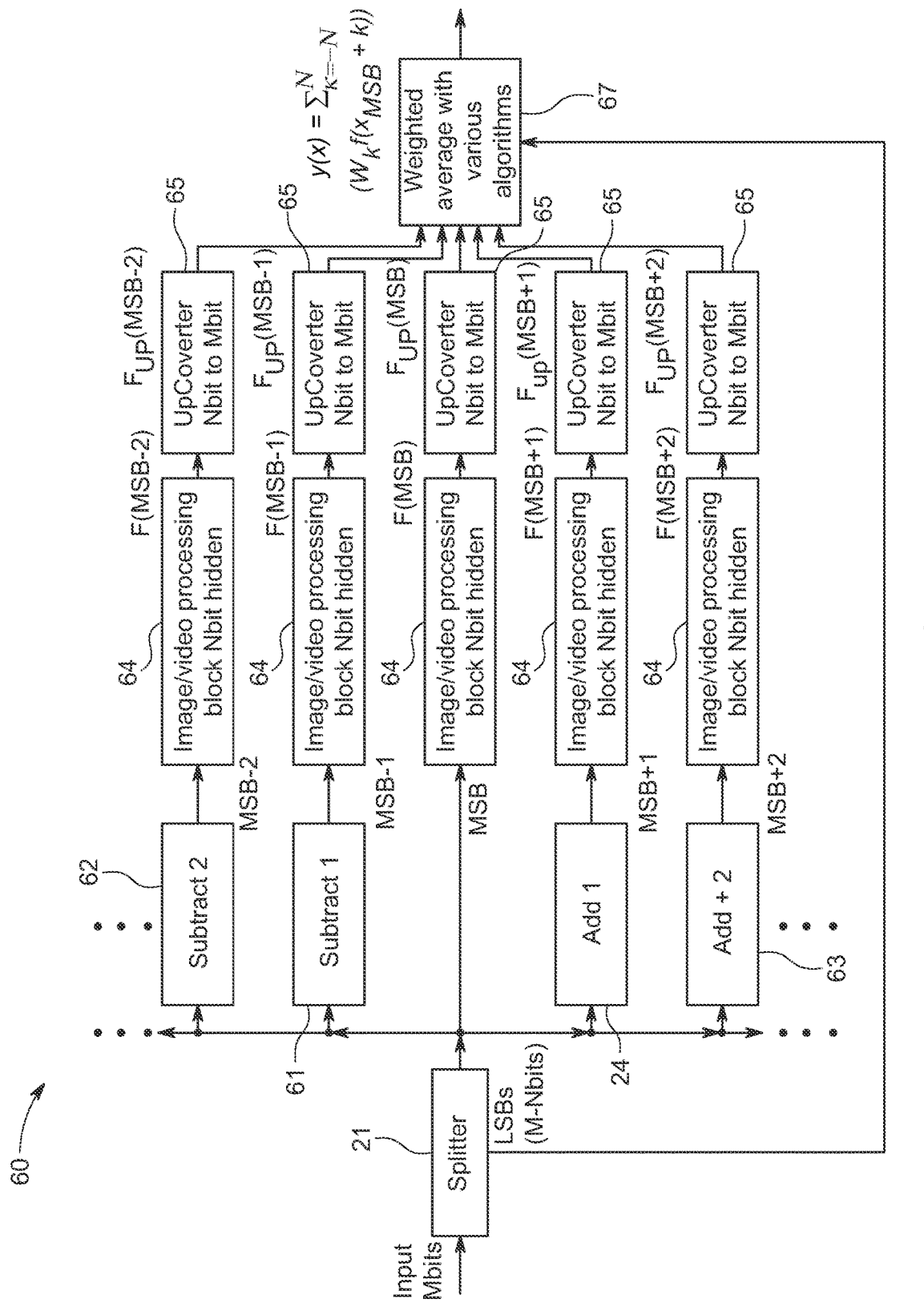
FIG. 6 illustrates yet another example architecture utilizing a weighted average of neighboring output of a low-bit processing block with estimated weights from various algorithms, according to some embodiments.

FIG. 6 illustrates yet another example architecture 60 utilizing a weighted average of neighboring output of a low-bit processing block with estimated weights from various algorithms, according to some embodiments. In one or more embodiments, the architecture 60 includes the splitter 21, a plurality of subtract functions 61, 62, etc., that subtract one or more bits, a plurality of addition process blocks (add+1 process block 24, add+2 process block 63, etc.), a plurality of image/video processing block Nbit hidden 64 (where N is a positive integer), a plurality of UpConverter Nbit to Mbit 65 (where N and M are positive integers, and M>N) and weighted average with various algorithms 67. Some embodiments provide the weighted average of neighboring outputs of low-bit processing blocks from the weighted average with various algorithms 67 using estimated weights from various algorithms, such as bilinear, bicubic, spline, histogram equalization, etc.

Figure 7:
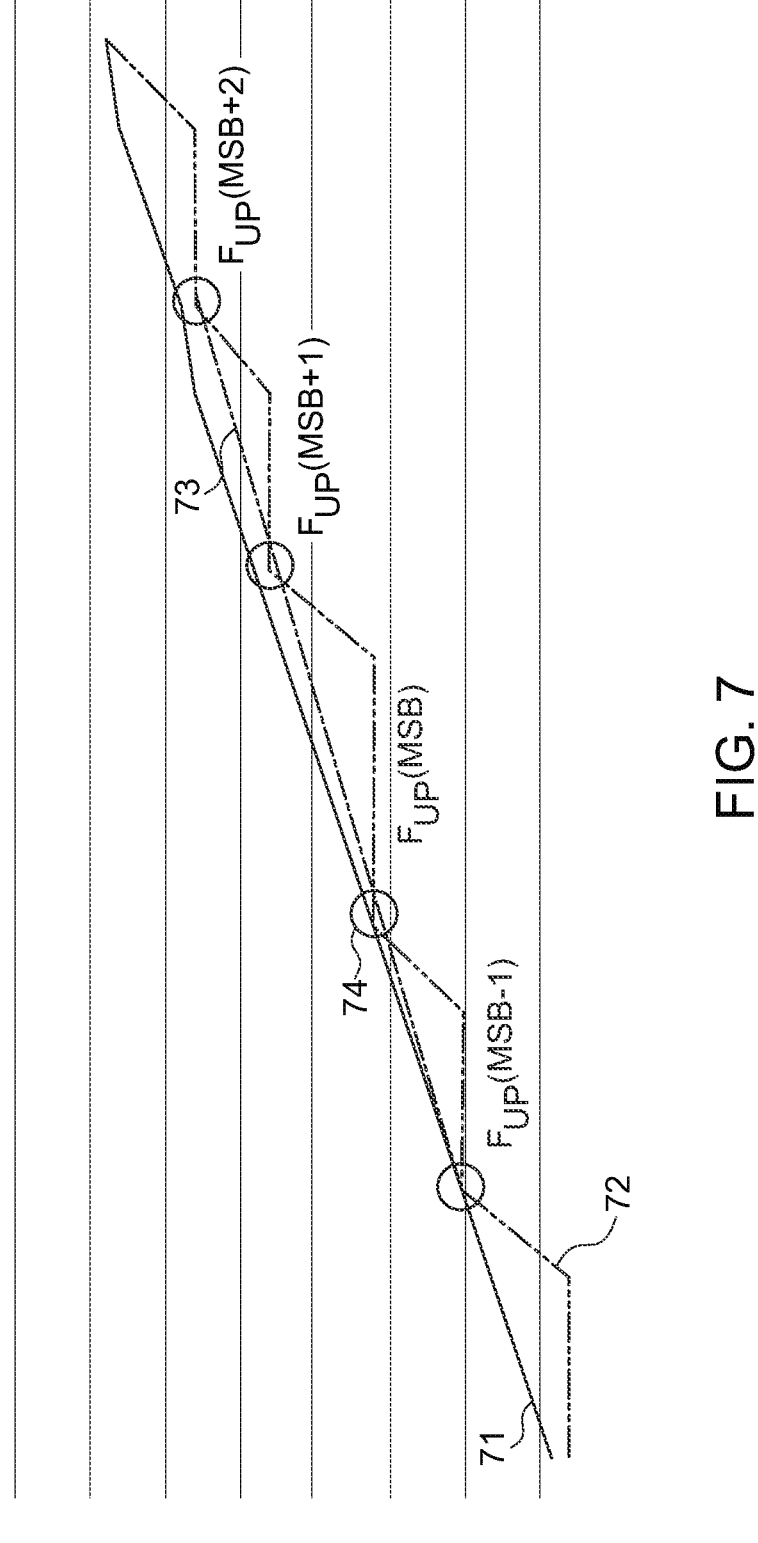
FIG. 7 illustrates an example comparative graph of multiple neighboring function outputs, according to some embodiments.

FIG. 7 illustrates an example comparative graph 70 of multiple neighboring function outputs, according to some embodiments. The graph 70 includes a high resolution function output 71, a low resolution function output 72 and an interpolated function output 73 based on one or more embodiments. Four neighboring function outputs 74 are also shown. In this example comparative graph 70, four (4) neighboring function outputs 74 are used in order for reconstruction of a high resolution function output. Some embodiments provide for interpolating a target function output using the given pixels with various algorithms. After the interpolation, the high resolution output is obtained by combining bypassed LSB and the estimated final output.

Figure 8:
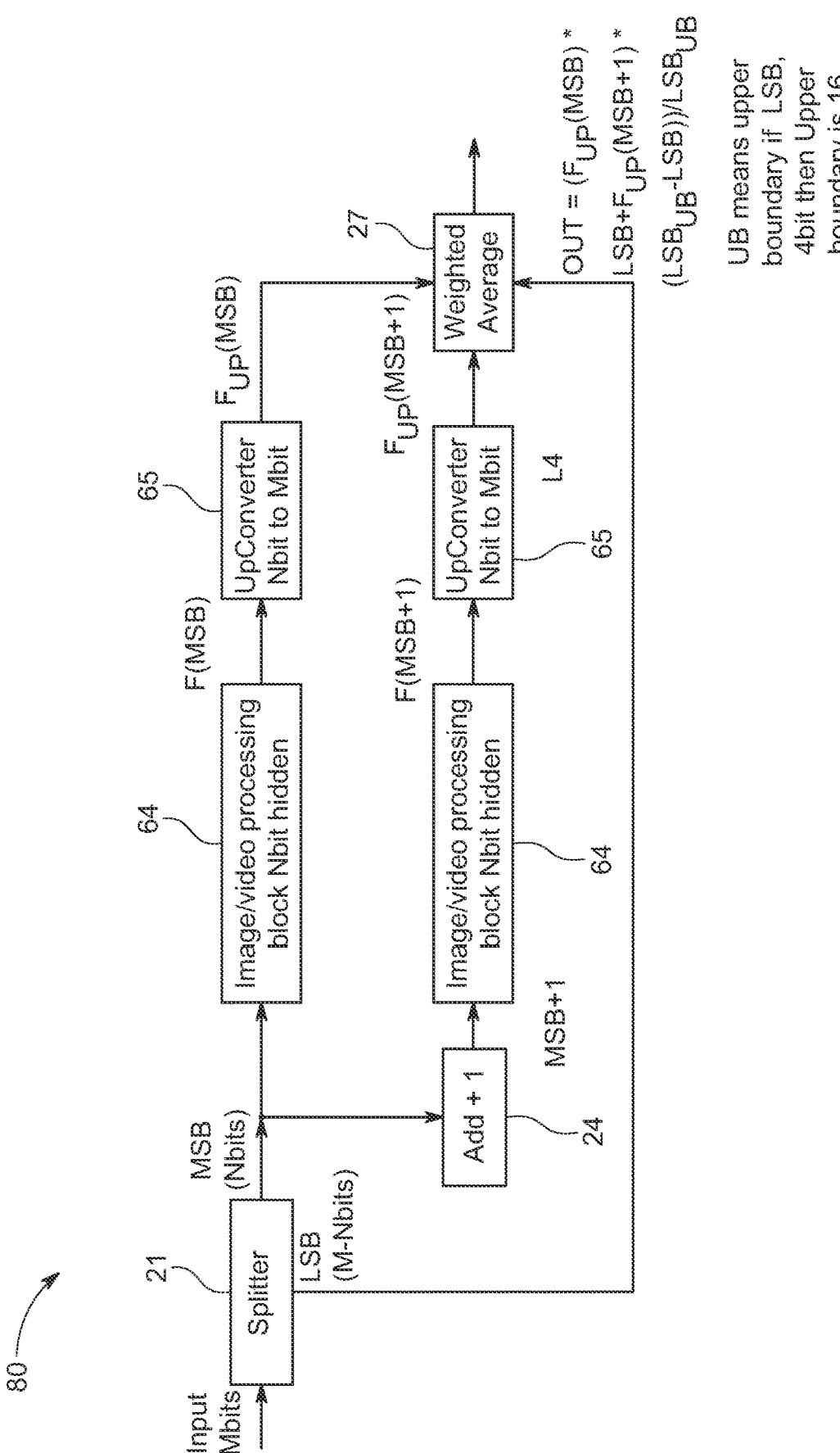
FIG. 8 illustrates still another example architecture utilizing a bilinear approach, according to some embodiments.

FIG. 8 illustrates still another example architecture 80 utilizing a bilinear approach, according to some embodiments. In one or more embodiments, the example architecture 80 includes a splitter 21, two image/video processing block Nbit hidden 64, two UpConverter Nbit to Mbit 65, an add+1 process block 24, and a weighted average process block 27. In some embodiments, this simple but effective implementation of the proposed algorithm is bilinear.

Figure 9:
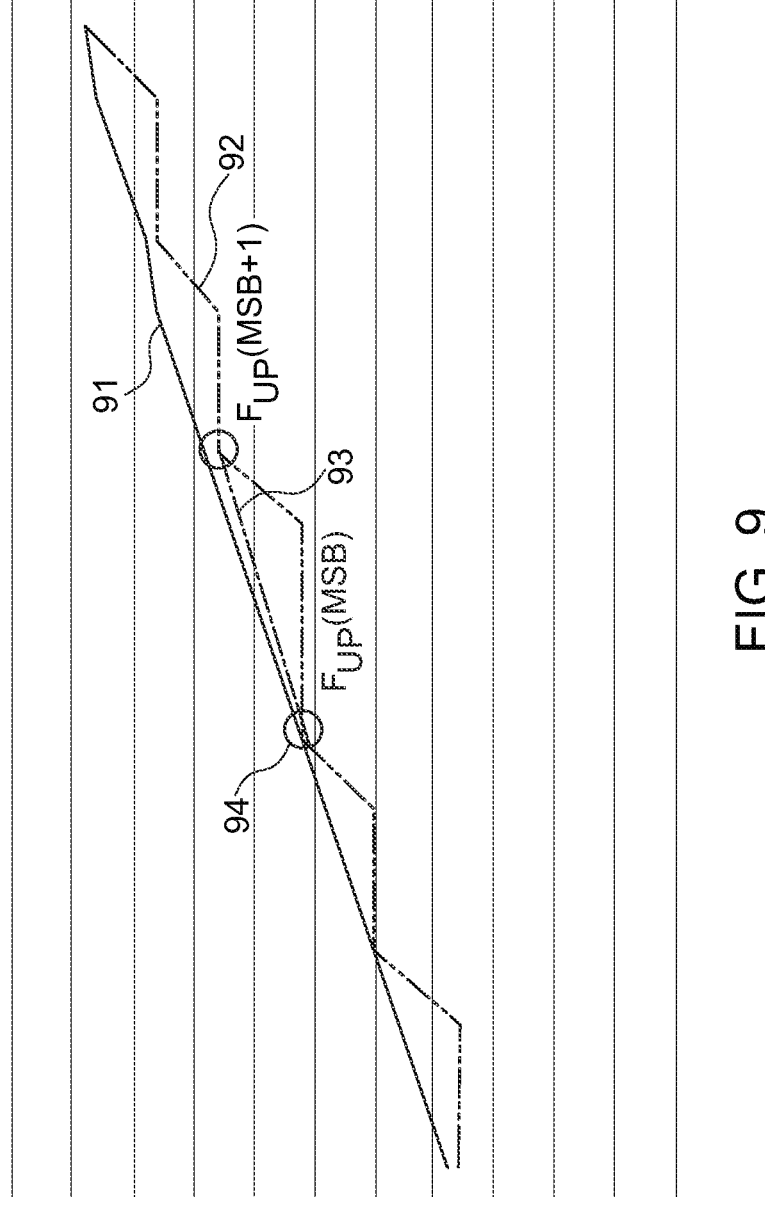
FIG. 9 illustrates an example comparative graph of bilinear function outputs, according to some embodiments.

FIG. 9 illustrates an example comparative graph 90 of bilinear function outputs, according to some embodiments. In one or more embodiments, the example architecture 80 may have similar results as the example architecture 80. The graph 90 includes a high resolution function output 91, a low resolution function output 92 and an interpolated function output 93 based on one or more embodiments. Two neighboring function outputs 94 are also shown. In this example comparative graph 80, two (2) neighboring function outputs 94 are used in order for reconstruction of a high resolution function output. Some embodiments provide for interpolating a target function output using the given pixels with various algorithms. After the interpolation, the high resolution output is obtained by combining bypassed LSB and the estimated final output.

FIG. 10 illustrates a process 1000 for preserve LSB information with low bit resolution processors, according to some embodiments. In block 1010, process 1000 receives content (e.g., a video, one or more images, etc.) having a first resolution (e.g., 4 bit, 8 bit, etc.). In block 1020, process 1000 splits (using a splitter 21, FIGS. 2, 4, 6, 8), by a processor (e.g., a computing processor/multiprocessor, etc.), the content into MSBs and LSBs. In block 1030, process 1000 performs, by the processor, processing of the MSBs of the content while preserving the LSBs. In block 1040, process 1000 performs, by the processor, a linear combination of outputs (e.g., weighted average 27, FIG. 2, 4, 8; weighted average with various algorithms 67, FIG. 6) of the processing of the MSBs with the preserved LSBs for improving quality of the content.

In some embodiments, process 1000 further provides that the outputs of the processing of the MSBs results in estimated weights.

In one or more embodiments, process 1000 further provides that the linear combination comprises a weighted average (e.g., weighted average 27, FIG. 2, 4, 8; weighted average with various algorithms 67, FIG. 6).

In one or more embodiments, process 1000 further provides that the outputs of the processing of the MSBs results in estimated weights.

In some embodiments, process 1000 additionally provides that the weighted average results in improvement of picture quality of a display based on utilization of parallelization and multi-instantiation of low-level content processing with additional systemic logic.

In one or more embodiments, process 1000 further provides that the additional systemic logic is configured for converting low-resolution black box blocks into a high-resolution sub-optimal processing block by combining low-resolution logic with LSBs of the content.

In some embodiments, process 1000 further includes that the weighted average comprises interpolating a final output with the outputs of the processing of the most significant bits with the preserved least significant bits.

In one or more embodiments, process 1000 additionally includes the feature that the final output comprises a same number of bits as the content.

In some embodiments, process 1000 further includes the feature that the content comprises n bit content, the most significant bits comprise m bits and the least significant bits comprise 1 bits, n is greater than m and 1, and m is greater than 1.

In one or more embodiments, process 1000 also includes the feature that the processing of the MSBs of the content includes parallel processing including a first processing block for the MSBs and a second processing block for the MSBs and an additional bit.

The present technology provides a better way to process a high bit resolution signal with a given processing block that is hidden. In one example embodiment, for an 8 bit image/video processing library, which source code is not available and there is a need to process 12 bit image/video where the output would typically lose 4 bit in detail. Using the present technology in this example embodiment, the system processes a 12 bit signal without the loss of 4 bits from the signal by utilizing 4 bit LSB (e.g., from a system on a chip (SoC), one or more algorithms/processes, etc.).

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A computer-implemented method, comprising:
receiving content having a first resolution;
splitting, by a processor, the content into most significant bits and least significant bits;
performing, by the processor, processing of the most significant bits of the content while preserving the least significant bits, wherein the processing of the most significant bits includes parallel processing a first version of the most significant bits and a second version of the most significant bits including an additional added bit; and
performing, by the processor, a linear combination of outputs of the processing of the most significant bits with the preserved least significant bits for improving quality of the content.

2. The computer-implemented method of claim 1, wherein the content comprises one or more images or a video content.

3. The computer-implemented method of claim 2, wherein the linear combination comprises a weighted average.

4. The computer-implemented method of claim 3, wherein the outputs of the processing of the most significant bits results in estimated weights.

5. The computer-implemented method of claim 4, wherein the weighted average improves picture quality of a display based on utilization of parallelization and multi-instantiation of low-level content processing with additional systemic logic.

6. The computer-implemented method of claim 5, wherein the additional systemic logic is configured for converting low-resolution black box blocks into a high-resolution sub-optimal processing block by combining low-resolution logic with least significant bits of the content.

7. The computer-implemented method of claim 4, wherein the weighted average comprises interpolating a final output with the outputs of the processing of the most significant bits with the preserved least significant bits.

8. The computer-implemented method of claim 7, wherein the final output comprises a same number of bits as the content.

9. The computer-implemented method of claim 1, wherein the content comprises n bit content, the most significant bits comprise m bits and the least significant bits comprise l bits, n is greater than m and l, and m is greater than l.

10. The computer-implemented method of claim 1, wherein the first version of the most significant bits comprises a first processing block for the most significant bits and the second version of the most significant bits comprises a second processing block for the most significant bits and the additional added bit.

11. A non-transitory processor-readable medium that includes a program that when executed by a processor performs improving picture quality of a display, comprising:
receiving content having a first resolution;
splitting, by the processor, the content into most significant bits and least significant bits;
performing, by the processor, processing of the most significant bits of the content while preserving the least significant bits, wherein the processing of the most significant bits includes parallel processing a first version of the most significant bits and a second version of the most significant bits including an additional added bit; and
performing, by the processor, a linear combination of outputs of the processing of the most significant bits with the preserved least significant bits for improving quality of the content.

12. The non-transitory processor-readable medium of claim 11, wherein the content comprises one or more images or a video content.

13. The non-transitory processor-readable medium of claim 12, wherein the outputs of the processing of the most significant bits results in estimated weights, and the linear combination comprises a weighted average.

14. The non-transitory processor-readable medium of claim 13, wherein the weighted average improves picture quality of a display based on utilization of parallelization and multi-instantiation of low-level content processing with additional systemic logic.

15. The non-transitory processor-readable medium of claim 14, wherein:
the additional systemic logic is configured for converting low-resolution black box blocks into a high-resolution sub-optimal processing block by combining low-resolution logic with least significant bits of the content;
the weighted average comprises interpolating a final output with the outputs of the processing of the most significant bits with the preserved least significant bits;
the final output comprises a same number of bits as the content;
the content comprises n bit content, the most significant bits comprise m bits, the least significant bits comprise l bits, n is greater than m and l, and m is greater than l; and
the first version of the most significant bits comprises a first processing block for the most significant bits and the second version of the most significant bits comprises a second processing block for the most significant bits and the additional added bit.

16. An apparatus comprising:

a memory storing instructions; and at least one processor executes the instructions including a process configured to:

receive content having a first resolution;

split the content into most significant bits and least significant bits;

perform processing of the most significant bits of the content while preserving the least significant bits, wherein the processing of the most significant bits includes parallel processing a first version of the most significant bits and a second version of the most significant bits including an additional added bit; and perform a linear combination of outputs of the processing of the most significant bits with the preserved least significant bits for improving quality of the content.

17. The apparatus of claim 16, wherein:

the content comprises one or more images or a video content;

the outputs of the processing of the most significant bits results in estimated weights;

the linear combination comprises a weighted average; and the weighted average improves picture quality of a display based on utilization of parallelization and multi-instantiation of low-level content processing with additional systemic logic.

18. The apparatus of claim 17, wherein:

the additional systemic logic is configured for converting low-resolution black box blocks into a high-resolution sub-optimal processing block by combining low-resolution logic with least significant bits of the content; and the weighted average comprises interpolating a final output with the outputs of the processing of the most significant bits with the preserved least significant bits.

19. The apparatus of claim 18, wherein:

the final output comprises a same number of bits as the content;

the content comprises n bit content;

the most significant bits comprise m bits;

the least significant bits comprise l bits; and n is greater than m and l, and m is greater than l.

20. The apparatus of claim 18, wherein:

the first version of the most significant bits comprises a first processing block for the most significant bits and the second version of the most significant bits comprises a second processing block for the most significant bits and the additional added bit.

* * * * *